United States Patent [19]

Philip et al.

[11] 4,300,230

[45] Nov. 10, 1981

[54] DIGITAL SWITCHING ARRANGEMENTS FOR STORED PROGRAM CONTROL TELECOMMUNICATIONS SYSTEMS

[75] Inventors: Alexander S. Philip, Dorset; Allen Parkinson, Chester; Michael G. Foxton, Suffolk; Frederick H. Rees, London; Graham Howard, Coventry; Anthony E. Shuttleworth, Burbage, all of England

[73] Assignees: The Plessey Company Limited, Ilford; The Post Office, London; Standard Telephones & Cables Limited, London; The General Electric Company Limited, London, all of England

[21] Appl. No.: 85,037

[22] Filed: Oct. 15, 1979

Related U.S. Application Data

[63] Continuation-in-part of Ser. No. 871,513, Jan. 23, 1978, abandoned.

[30] Foreign Application Priority Data

Apr. 5, 1977 [GB] United Kingdom ............... 14409/77

[51] Int. Cl.³ .......................... H04J 3/14; H04Q 11/04
[52] U.S. Cl. .......................................... 370/63; 370/13
[58] Field of Search ...................... 370/63, 68, 58, 59, 370/13, 60

[56] References Cited

U.S. PATENT DOCUMENTS

| | | | |
|---|---|---|---|
| 3,937,935 | 2/1976 | LePabic | 370/13 X |
| 3,974,340 | 8/1976 | Ghisler | 370/63 |
| 4,048,445 | 9/1977 | Ghisler | 370/63 X |
| 4,064,370 | 12/1977 | Coonce et al. | 370/58 |
| 4,068,098 | 1/1978 | Thyselius | 370/66 |
| 4,081,611 | 3/1978 | Bovo et al. | 370/63 |
| 4,131,762 | 12/1978 | Reid | 370/68 X |
| 4,160,127 | 7/1979 | Slana et al. | 370/63 X |

FOREIGN PATENT DOCUMENTS

| | | | |
|---|---|---|---|
| 2427668 | 1/1975 | Fed. Rep. of Germany | 370/13 |
| 2718317 | 11/1978 | Fed. Rep. of Germany | 370/13 |

*Primary Examiner*—Thomas W. Brown
*Attorney, Agent, or Firm*—Fleit & Jacobson

[57] ABSTRACT

A digital switching arrangement for use in a telecommunications exchange handling channels of digital information in time division multiplex form. The digital switching arrangement being particularly suited for use in stored program processor controller environments. The arrangement comprises a digital switching network and a control equipment. The control equipment includes an input queue and an output queue each arranged to store processor input and output messages respectively. The control arrangement is arranged to asynchronously process each output message to process switching network path connections and to generate in the input queue an input message indicative of the actions performed. Each output message includes switching network identification information indicative only of the identities of the incoming and outgoing exchange highways and channels to be involved in the switching network path to be processed.

7 Claims, 16 Drawing Figures

DIGITAL SWITCHING ARRANGEMENTS FOR STORED PROGRAM CONTROL TELECOMMUNICATIONS SYSTEMS

This is a continuation-in-part of copending application Ser. No. 871,513 filed on Jan. 23, 1978, now abandoned.

The present invention relates to telecommunications systems involving digital switching and is more particularly concerned with digital switching arrangements suitable for incorporation in telecommunication exchanges which are under the overall control of stored program controlled data processing equipment.

In prior art processor controlled telecommunications switching systems it is usual for the processor equipment to handle all the steps in the processing of each call by "responding-to" each event as detected in the switching network and issuing "instructions-to" the switching network to control the setting-up of each component part of the required connections. However, when such techniques are applied to the control of switching networks handling time division multiplexed digital or pulse code modulated channels the input/output activity required for the processor becomes so significant that the processor equipment becomes overloaded with the processing of the input/output messages alone.

Accordingly it is an aim of the present invention to provide a digital switching sub-system for use in a telecommunications exchange using stored program control arrangements which sub-system allows for the internal processing of digital switch control functions, thus relaxing the throughput and timing demands made on the exchange central processing system.

According to the invention there is provided a digital switching arrangement for use in a processor controlled telecommunications switching exchange, the arrangement comprising (i) a digital switching network arranged to provide connection between any channel or any of a number of incoming time-division multiplexed exchange highways and any channel on any of a number of outgoing time division multiplexed exchange highways and (ii) a control hardware arrangement including a processor input queue and a processor output queue each arranged to store in time of arrival order input and output messages and the control hardware arrangement is arranged to asynchronously process each output message to search, trace or cleardown a switching network path and at the end of such a processing operation to generate in the input queue an input message indicative of the actions performed in the handling of each output message and each output message includes switching network identification information indicative only of the identities of the highways and channels involved in the switching network path.

The control hardware arrangement includes central control units (CCU's) arranged to execute the programs necessary to perform path search, path trace and path cleardown operations. The CCU's may typically take the form of micro-processors or dedicated logic blocks. For security purposes three CCU's are provided arranged to operate in parallel on the same digital switching subsystem task.

A further important CCU feature is its communication with the switch peripherals via an "addressed tree" structure which is replicated to correspond with the security triplication of the CCU's and which is physically associated with the CCU logic in a manner which allows efficient and straightforward fault diagnosis. Additionally, this communication medium is arranged to operate in a semi-synchronous manner relative to the switchblock, the degree of synchronism permitting commonality of waveform supplies but not allowing transmission speed constraints to penalise implementation of the communication network or connection control logic. Advantage is taken of the synchronisation of the CCU/switch communication medium in detecting and avoiding faults by applying majority decision techniques where replicated CCU outputs converge at peripheral devices. Further, synchronous communication between CCU and replicated switching units aids the detection of any discrepancy between such replicated units. However, the facility of independent communication with individual replicated components of a given switch unit is retained and can be utilised under software control during routining or fault circumvention procedures.

By controlling its commuication network to the switch the CCU can observe the contents of those connection control stores relevant to the interconnection of switch terminations specified by software. Then the CCU is capable of selecting a free path between switch terminations (using a simplex interrogation path from the control stores) and establishing the chosen connection (using a half-duplex control path ganged to the simplex interrogation path). Clear, trace and check commands and responses are also communicated between CCU and switch using the half-duplex control path only.

The invention together with its various features should be more readily understood from the following description of an exemplary embodiment thereof, in which.

Figure 1:
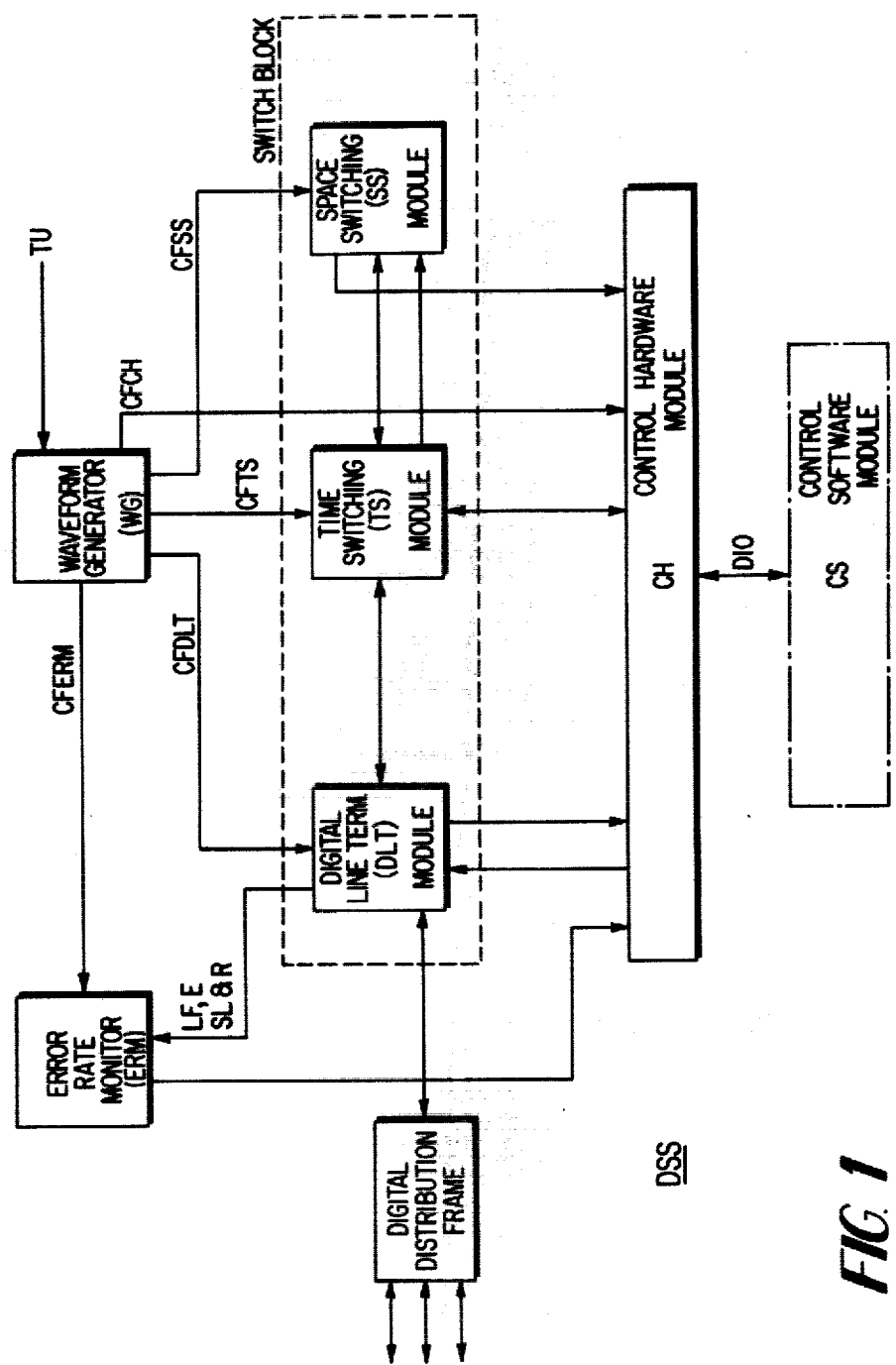
FIG. 1 shows a block diagram of a digital switching arrangement (DSS)
Figure 4:
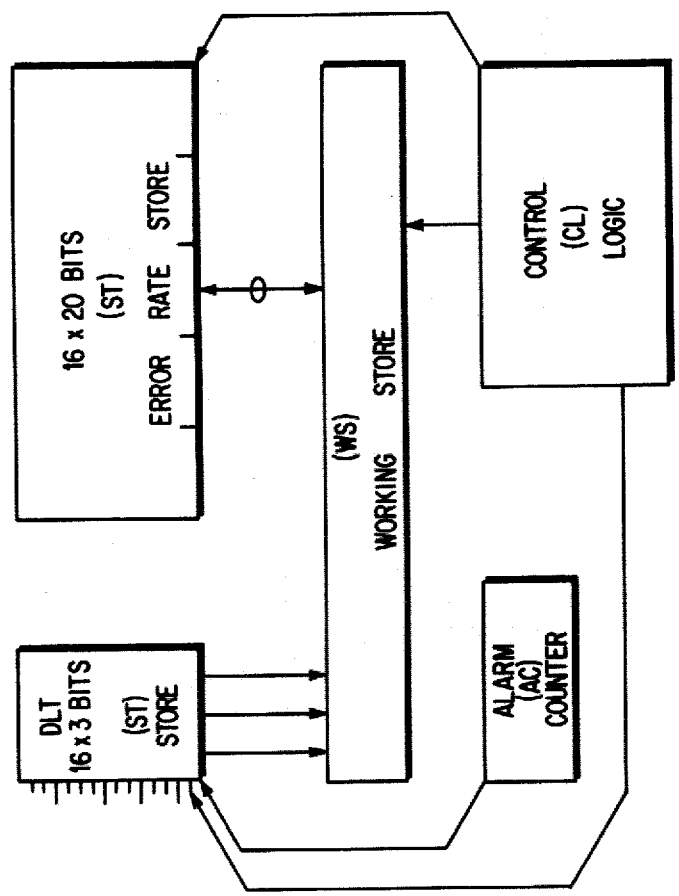
Figure 5:
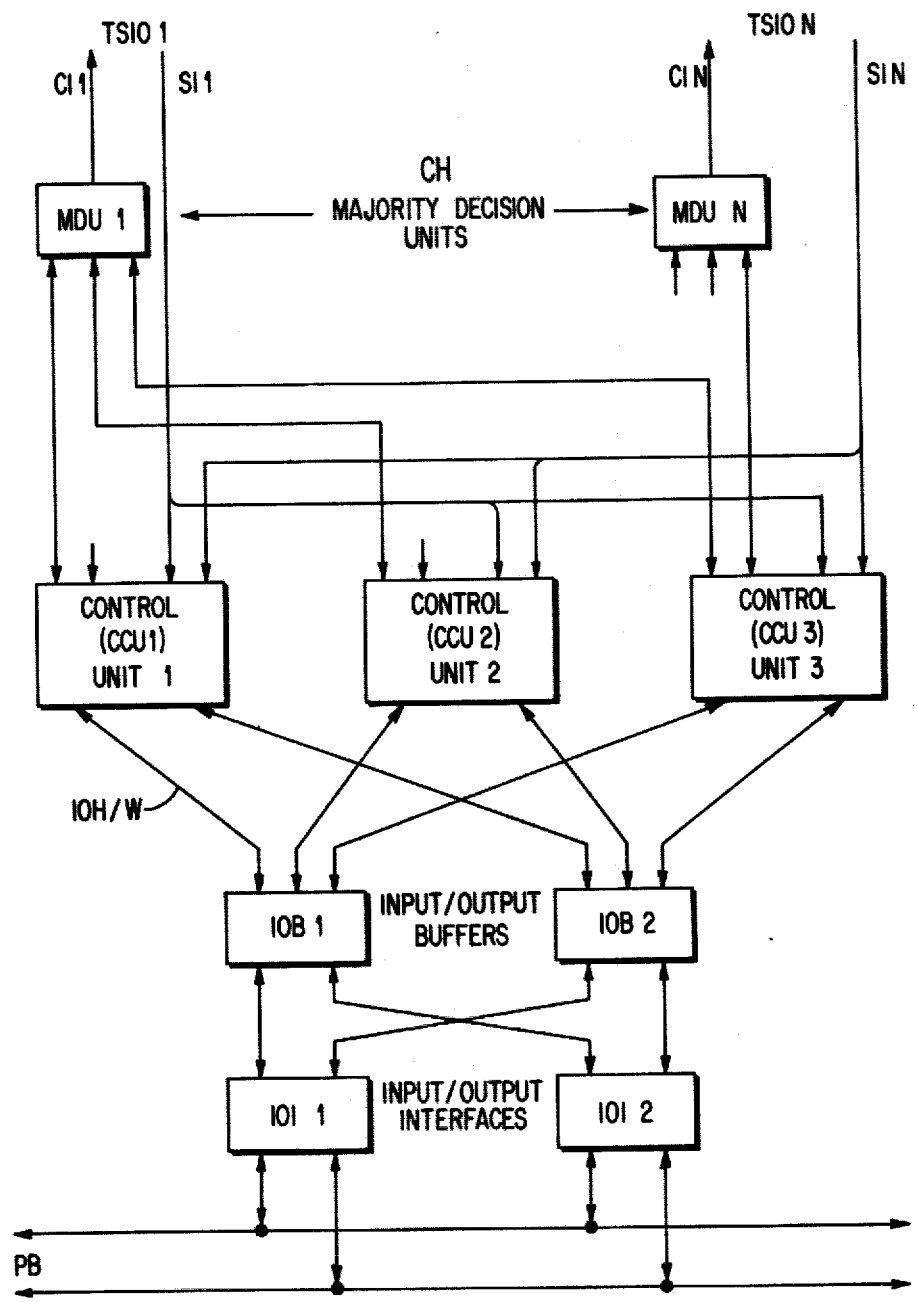
Figure 6:
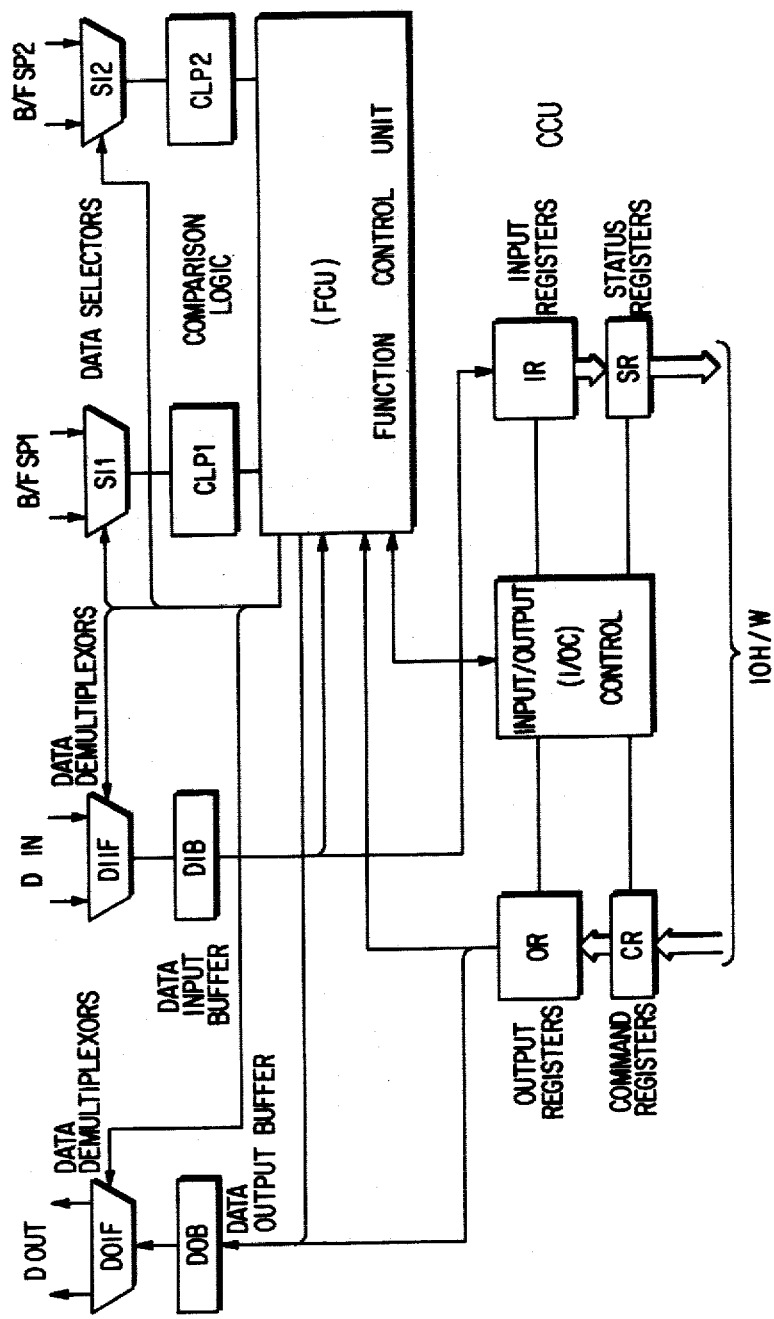
Figure 7:
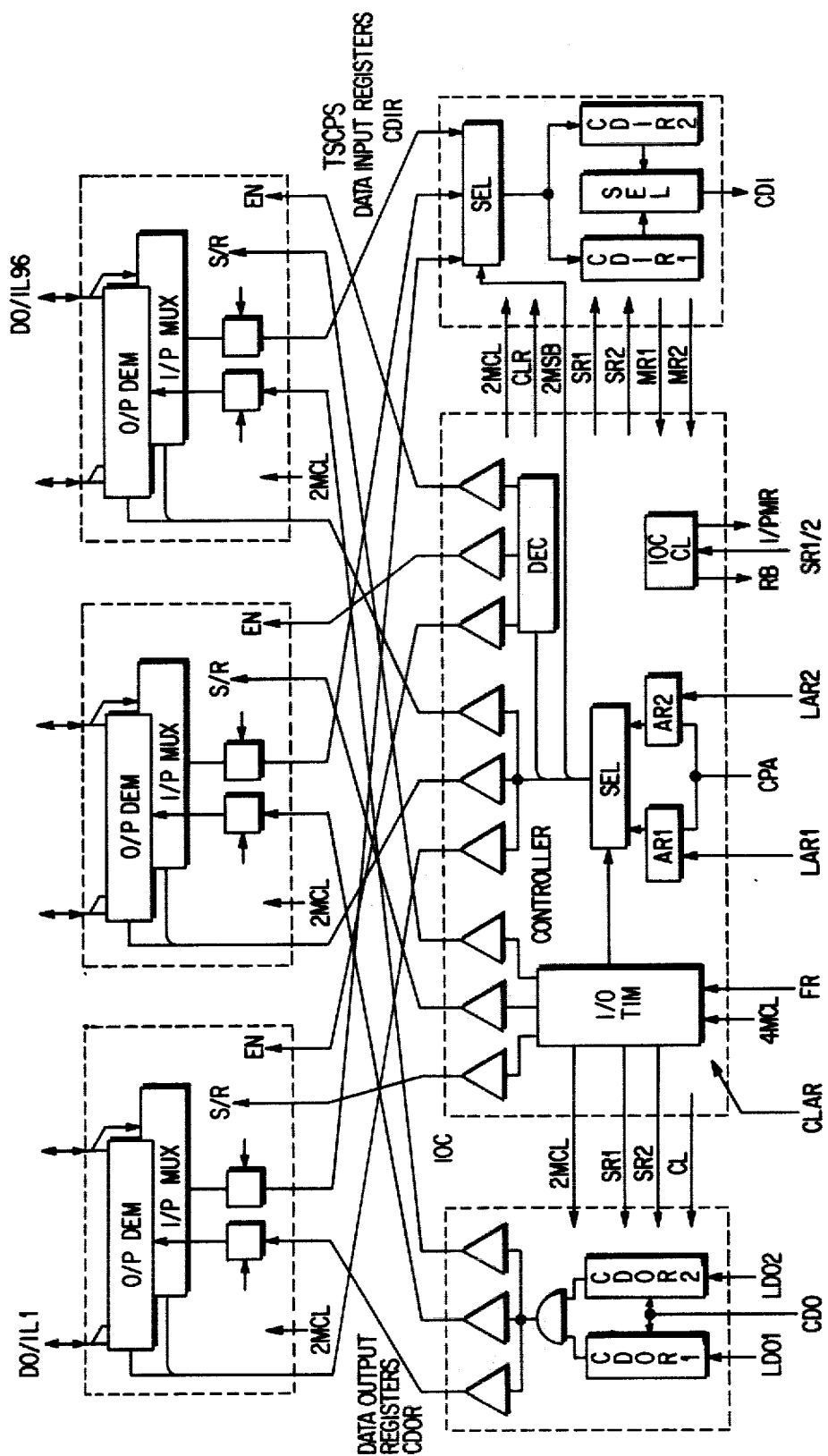
Figure 8:
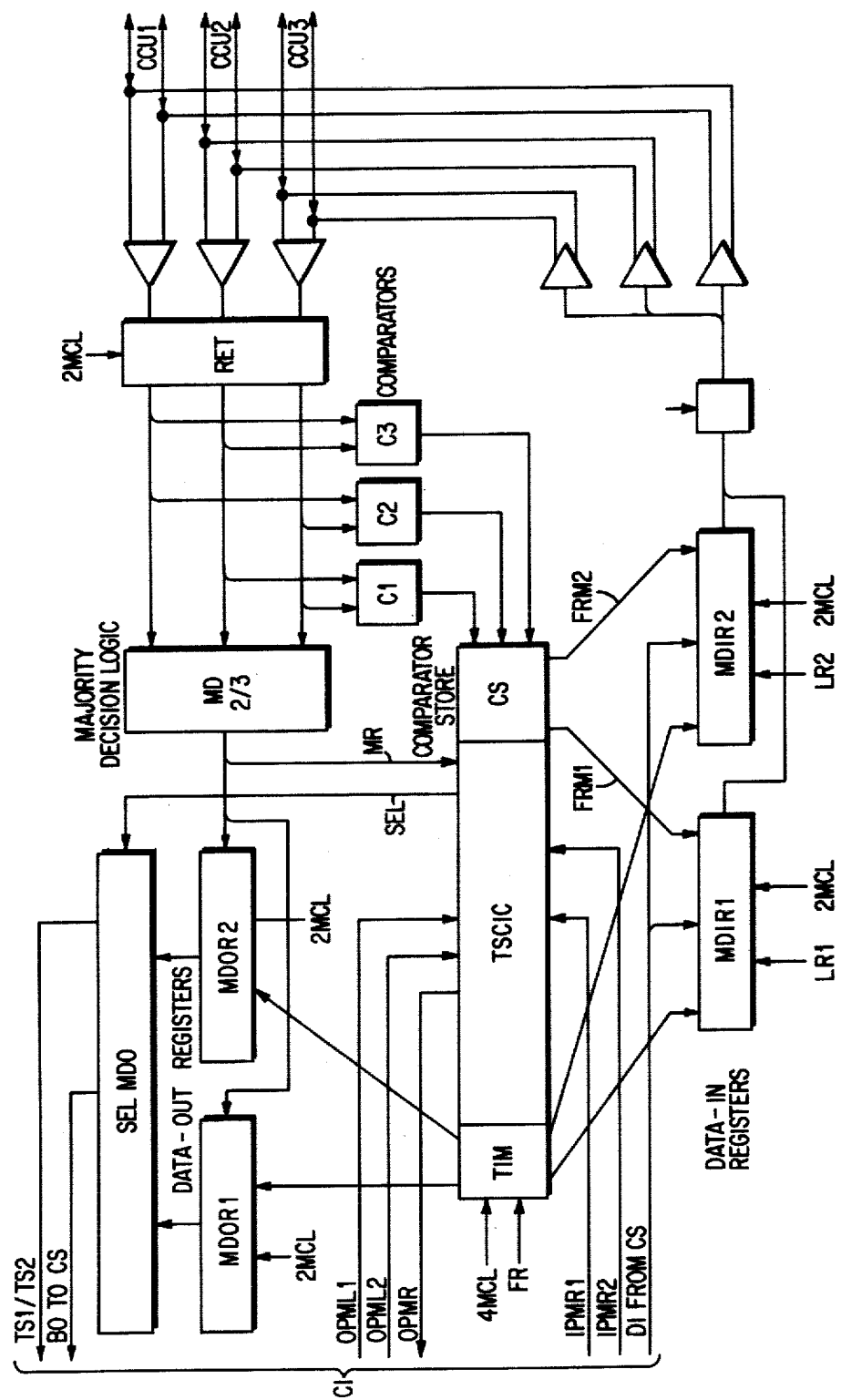
Figure 9:
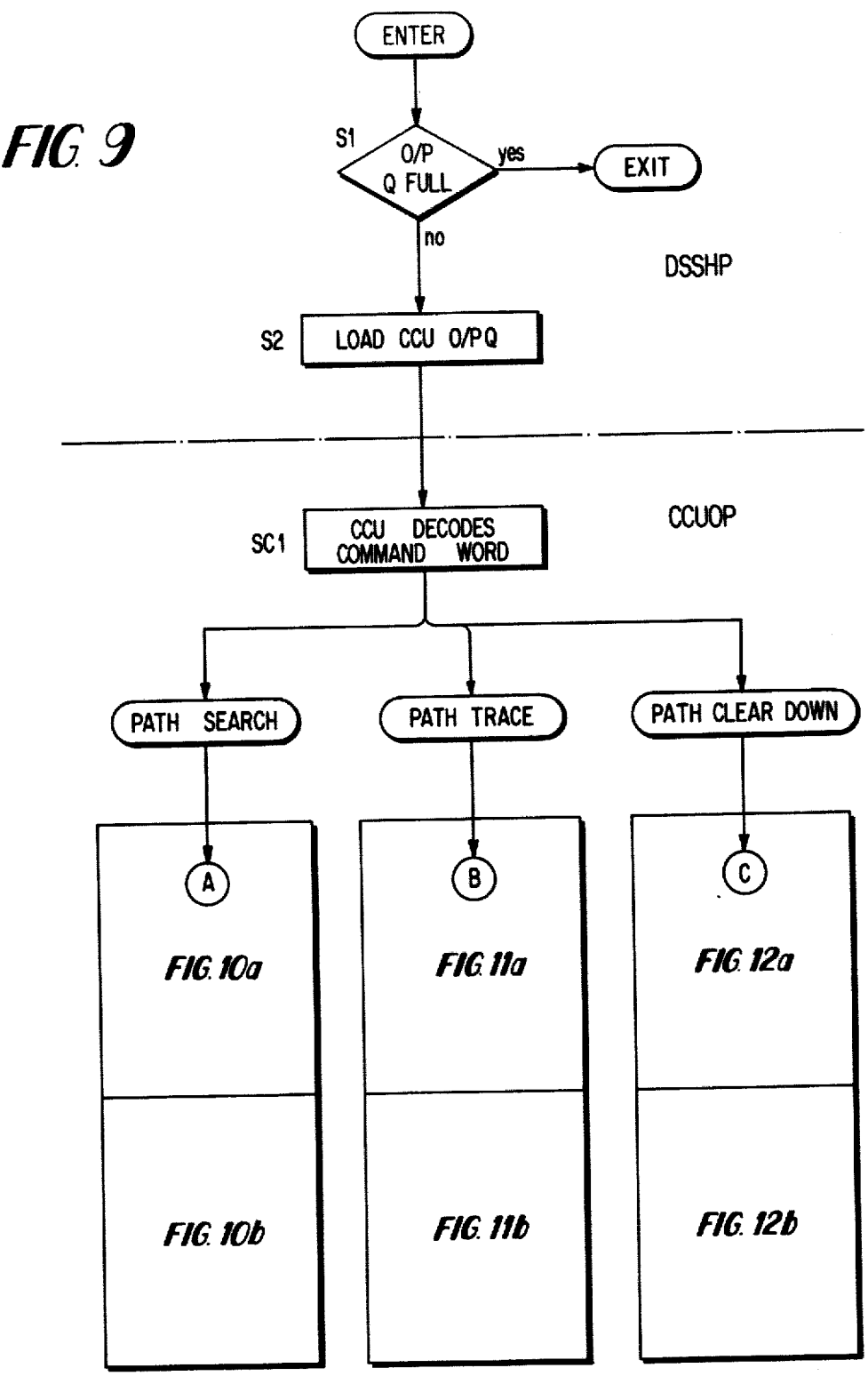
Figure 10A:
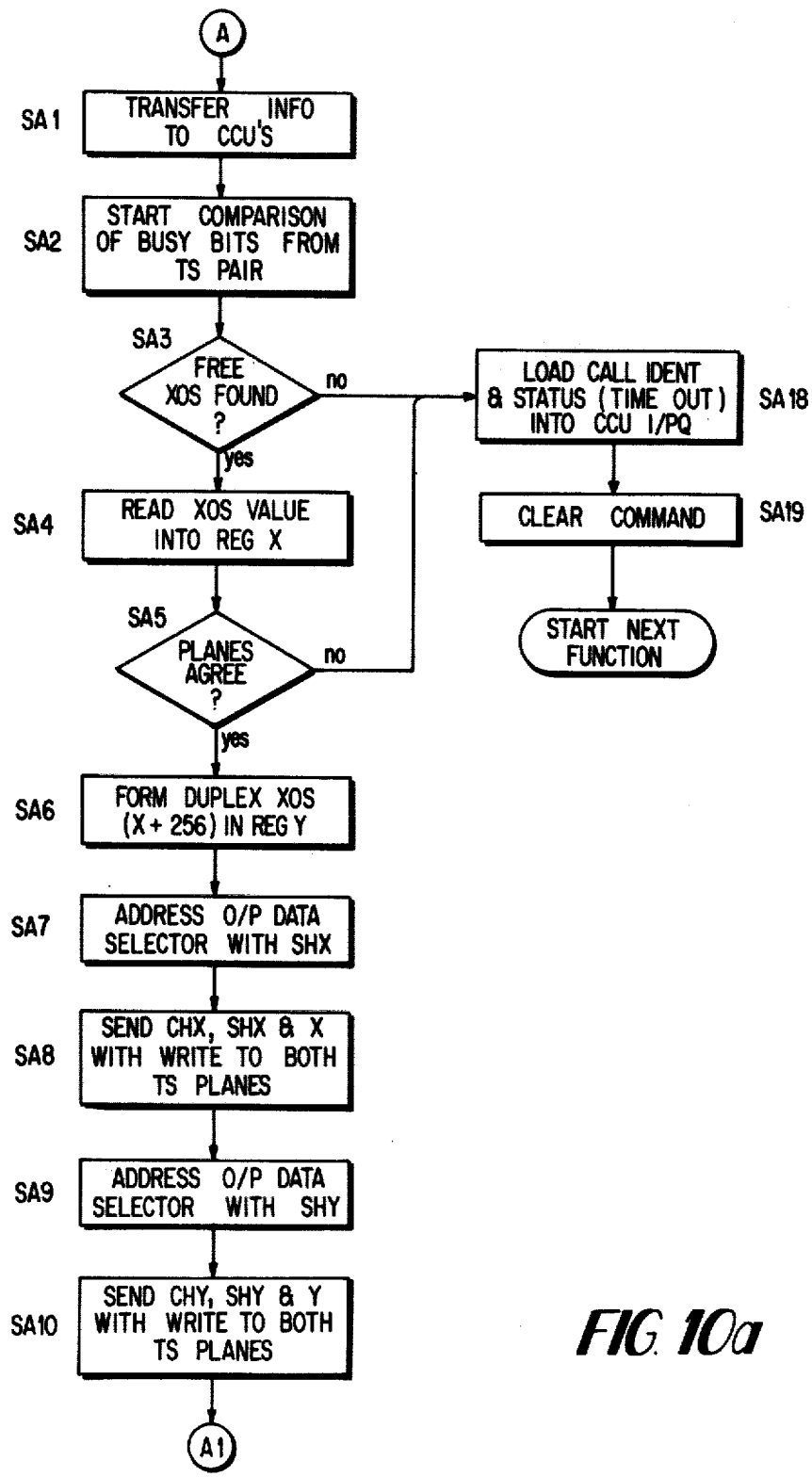
Figure 10B:
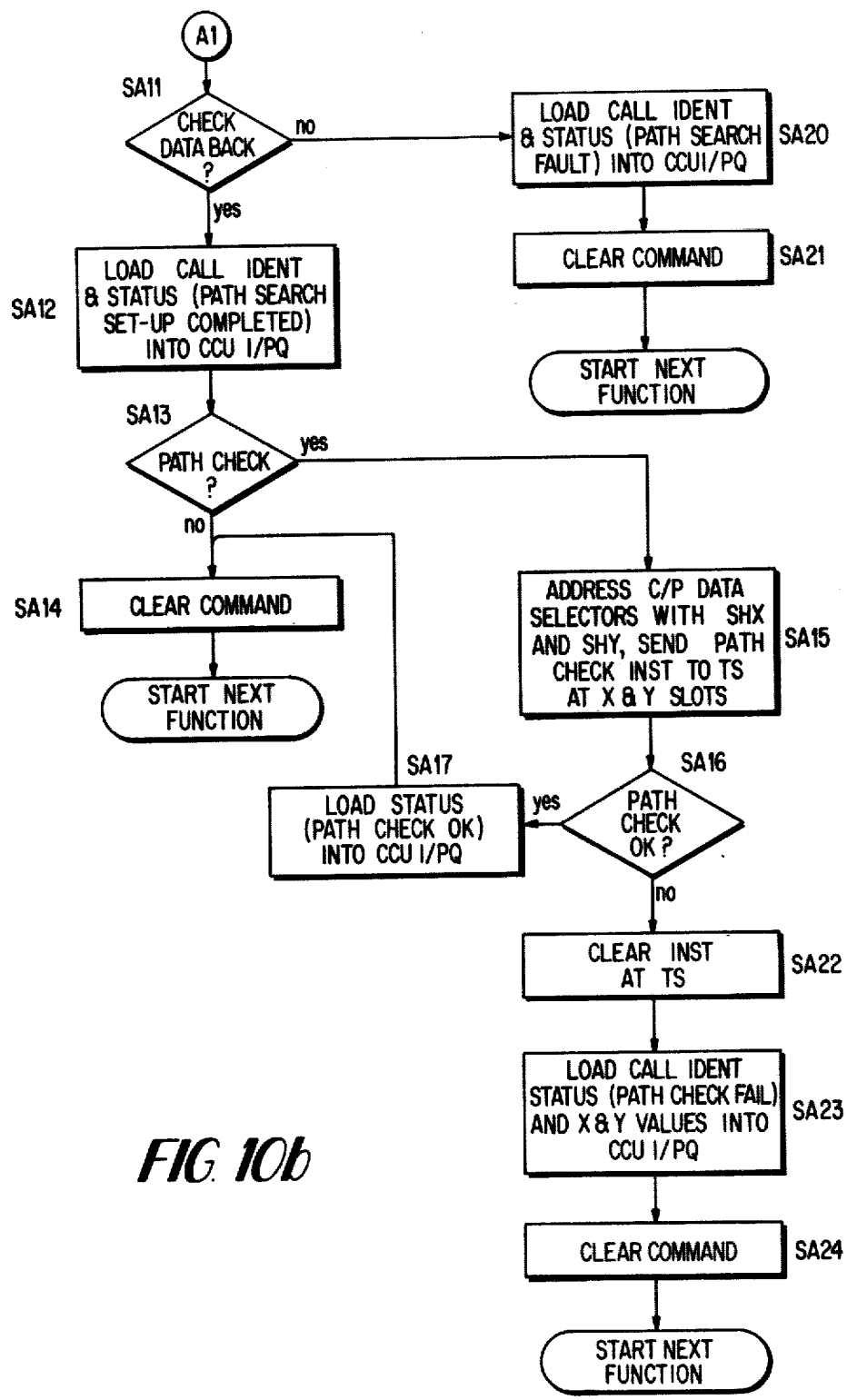
Figure 11A:
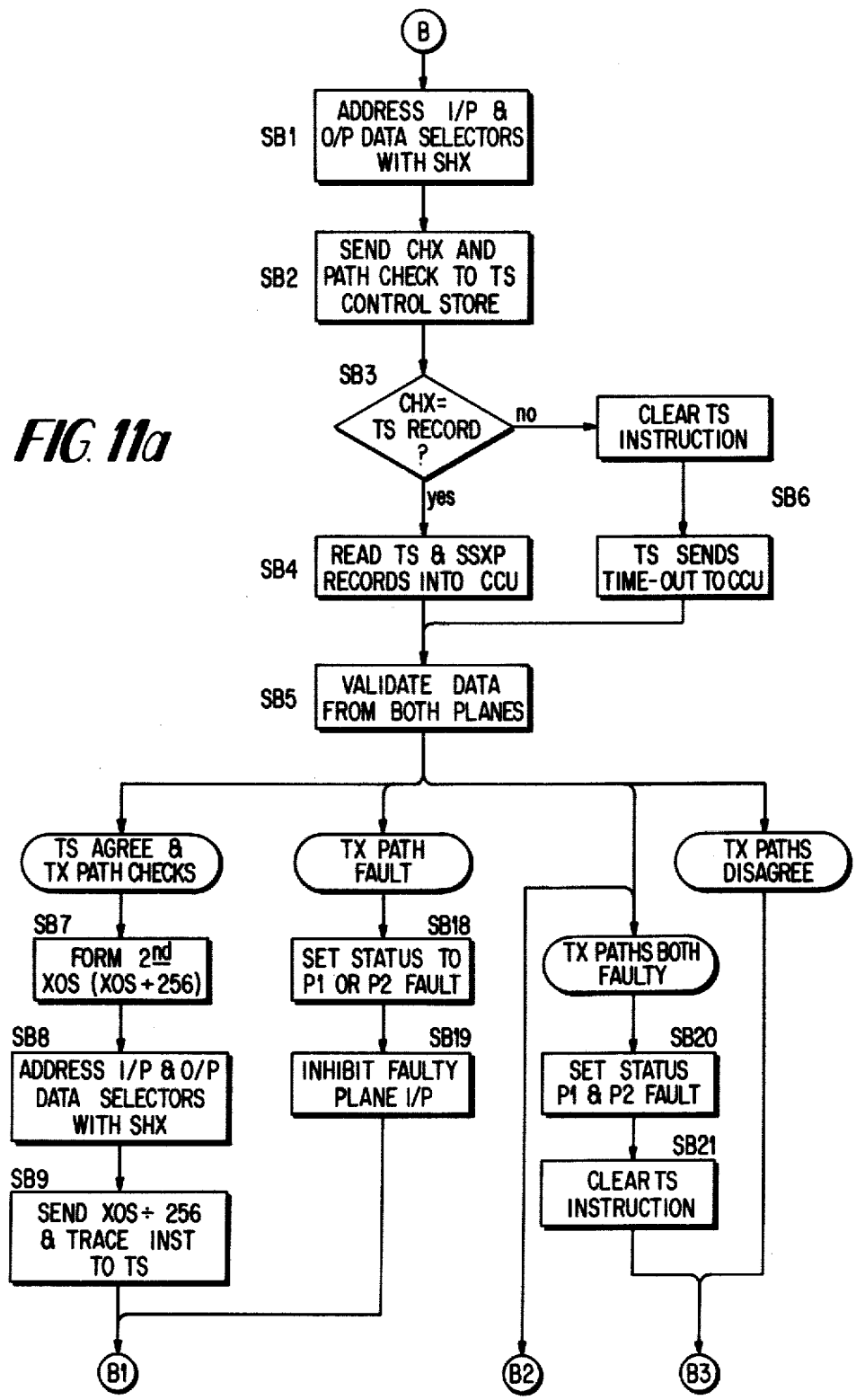
Figure 11B:
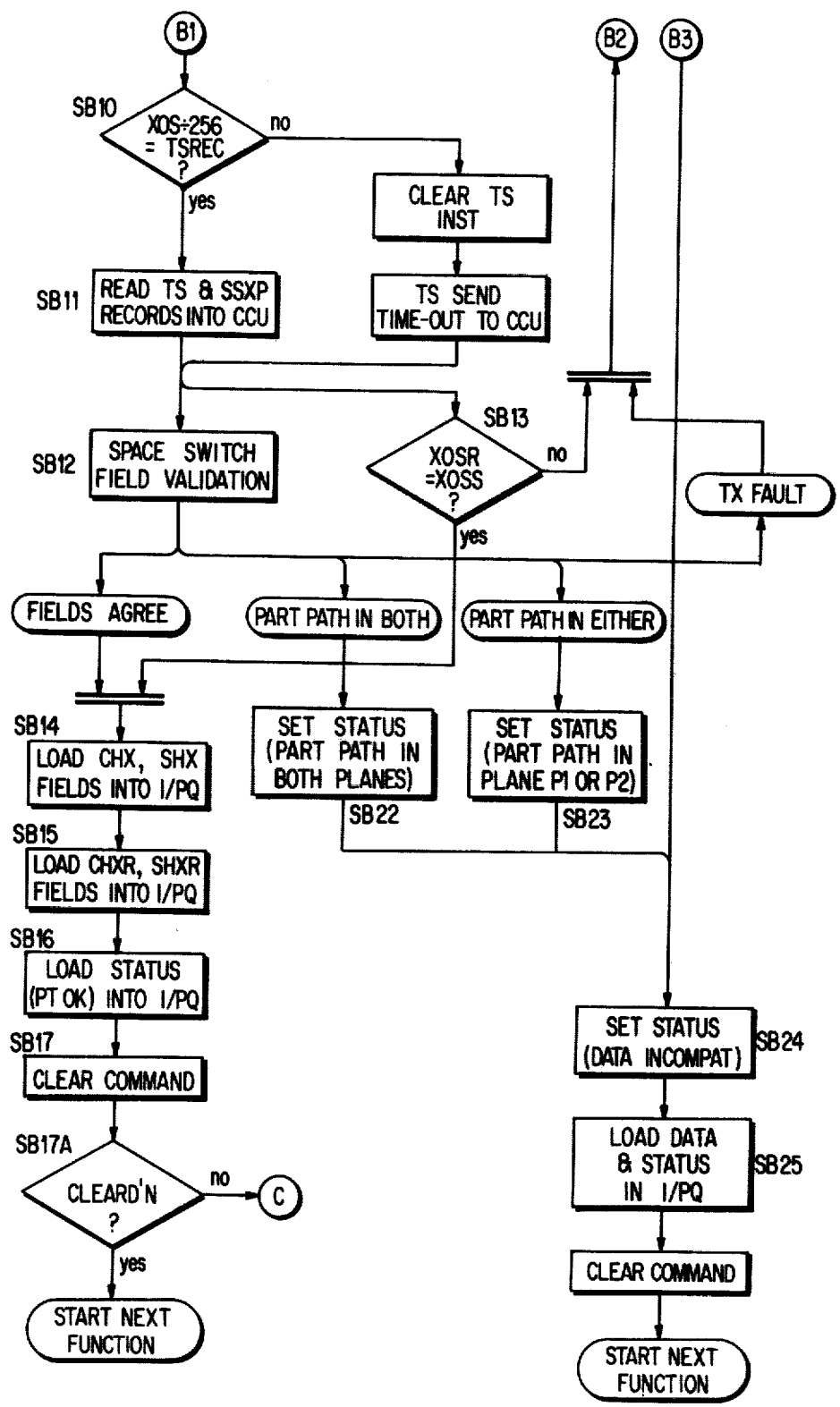
Figure 12A:
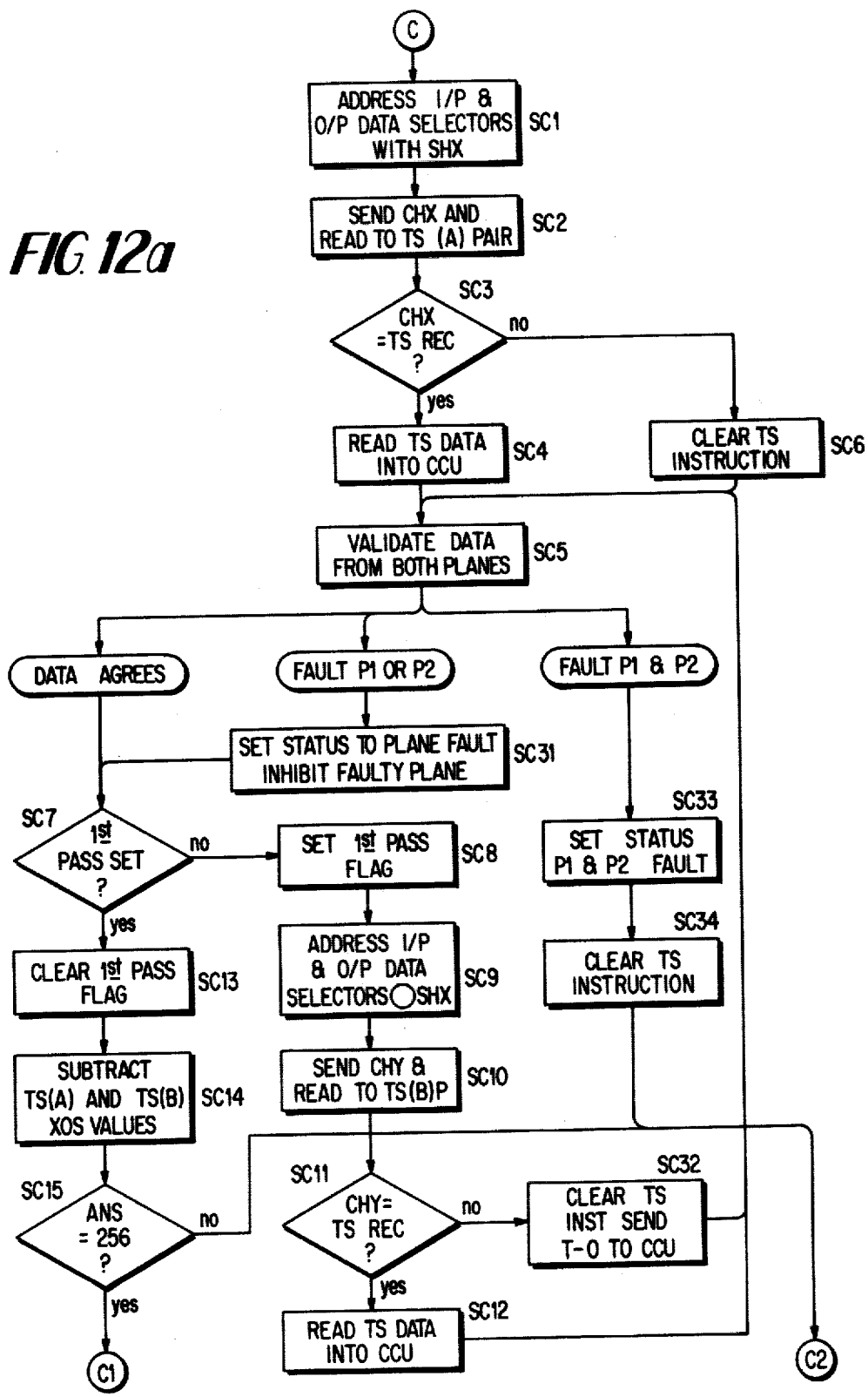
Figure 12B:
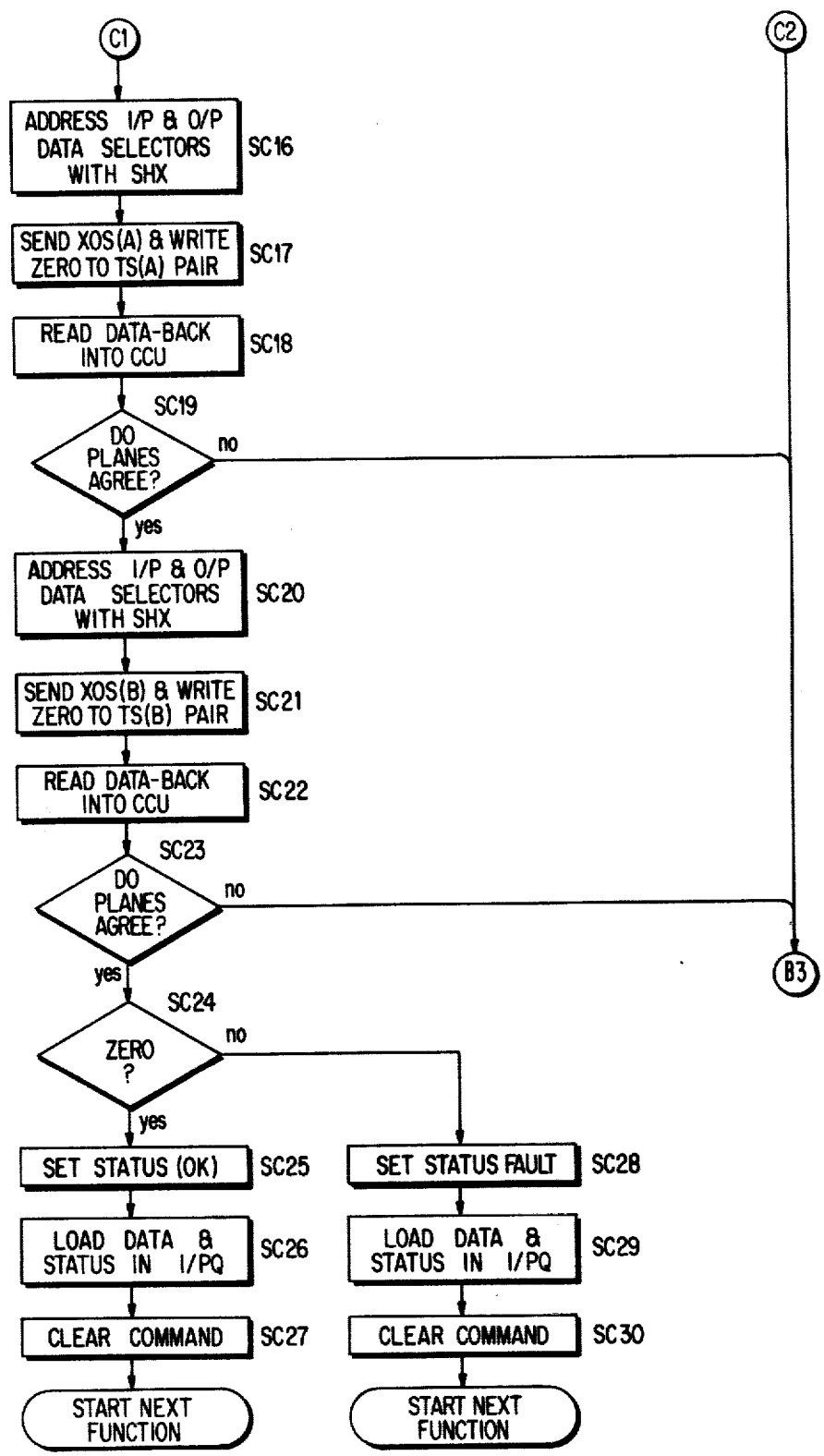
Figure 13:
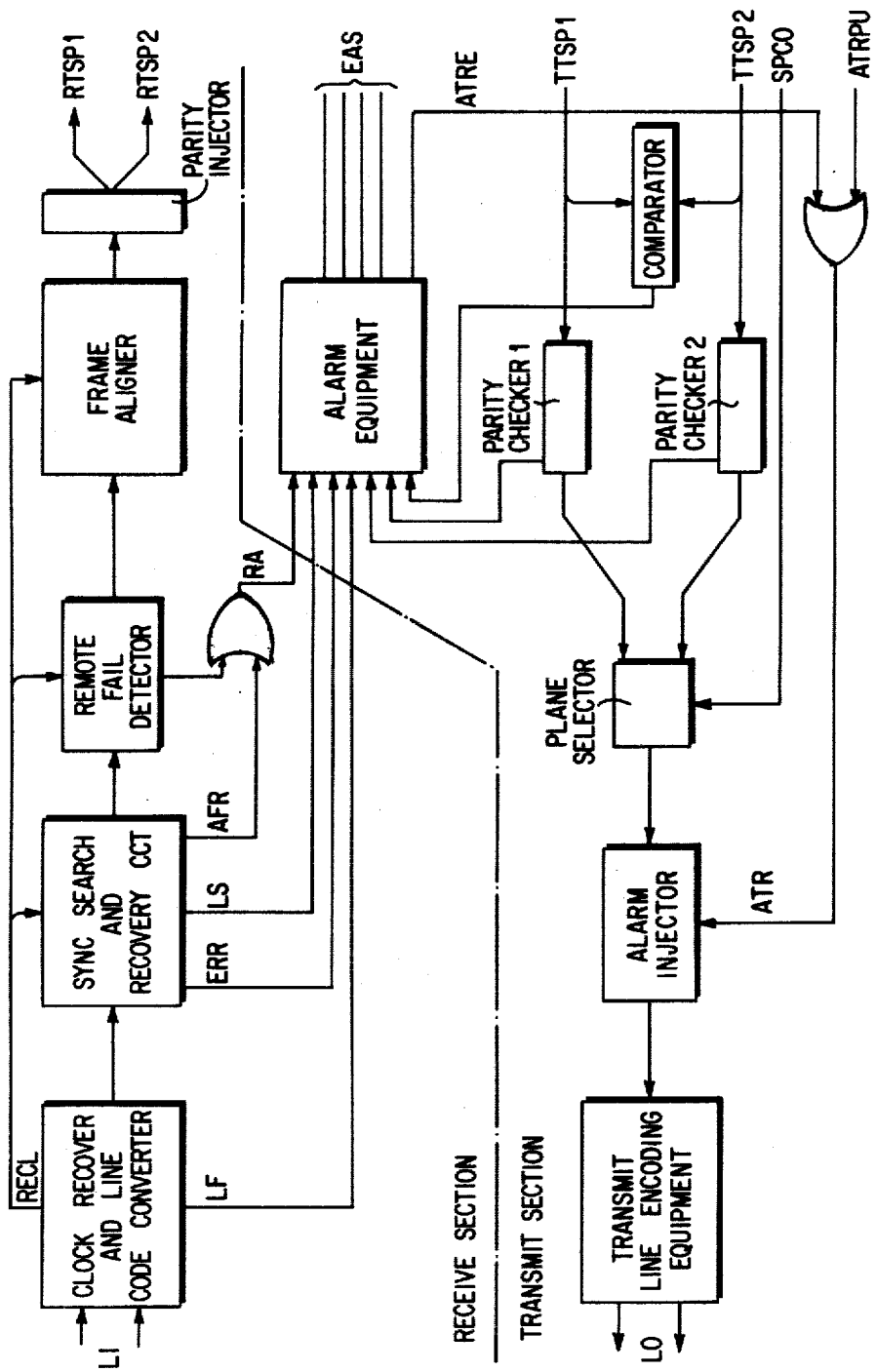

FIG. 4 shows a block diagram of an error rate monitor for use in the arrangement of FIG. 1, FIG. 5 shows a block diagram of the control hardware of FIG. 1, FIG. 6 shows a block diagram of a CCU of FIG. 5, FIG. 7 shows a block diagram of a time switch control port selector, FIG. 8 shows a block diagram of a majority decision unit, FIG. 9 shows a flow diagram of the operations performed by the DSS, FIGS. 10a and 10b show a flow diagram of the "path-search" sequence, FIGS. 11a and 11b show a flow diagram of the "path-trace" sequence, FIGS. 12a and 12b show a flow diagram of the "path-cleardown" sequence while, FIG. 13 shows a block diagram of a digital line termination unit.

The digital switching subsystem DSS is shown in FIG. 1 and comprises a combination of hardware and software modules which provide a general purpose switching facility. The digital switching subsystem is ideally suited for application at a group switching centre, a Junction Tandem, an International Switching Centre and at Automanual levels of the telephone network and will have an additional role in digital data networks.

The subsystem (DSS) provides full accessibility between any two channels terminating on its switchblock SB and it is arranged to grow smoothly over a range of conversational traffic capacities. interruptions of service due to exchange extension are avoided by the use of a facility which allows one of a pair of duplicated switch block planes to be "biased" to carry all calls.

The Digital Switching Subsystem switchblock, (SB) belongs to the Time-Space-Time, or so-called T-S-T, family. Specifically, segmentation of the central space stage results in a T(s)S(s)T format. The (s) component denotes an access mechanism between T stages and the central space switch (S) segments. Quality of service characteristics appropriate to the multiplexed nature of the traffic are satisfied by duplication of switching planes of the switchblock.

The subsystem DSS maintains a record of the busy/free state of each of its internal paths and in addition to selecting, setting up and clearing down connections, it is capable of tracing, busying and reserving paths. Additionally, an internal digital switching subsystem pathcheck mechanism is provided. Connections are normally duplex but the ability to set up a simplex path is also included by placing one half of the duplex connection in reserved mode, thus making particularly efficient use of the "reserve" status bit in the control stores. The subsystem DSS provides maintenance information concerning both switch and transmission system alarms. Test terminations are provided on the subsystem for use in both switch and circuit routing purposes. Routing access from the DSS handler process to the switch central control hardware is also provided. When access to switch hardware is required for traffic statistics purposes this function is integrated with the control and maintenance interfaces.

Switching will be performed with reference to a local timebase originated by a Timing Unit located in the Network Synchronisation Subsystem and supplied via the digital switching subsystem waveform generator (WG).

All bit streams terminating on the subsystem DSS will be frame aligned external to the basic switching mechanism. Alignment-induced information loss will occur in integral frame units. The subsystems is responsible for insertion of all outgoing synchronisation patterns and additionally transmits idle codes.

The main switchblock SB also fulfils the role of an access switch, making connections to tone, signalling, maintenance, and other auxiliary units on a semi-permanent or call-by-call basis.

The subsystem DSS as mentioned previously is formed of a number of modules. These modules are shown in FIG. 1 and comprise a digital distribution frame (DDF), a switch block module (SB), a control hardware module (CH), a waveform generator module (WG) and an error rate monitor module (ERM) together with a control software module (CS). Consideration of each of the modules will now be given.

DIGITAL DISTRIBUTION FRAME MODULE (DDF)

The digital distribution frame (DDF) is primarily a flexibility point for p.c.m. multiplexes. The majority requirement is for 2048 kb/s interconnection but higher order systems and 1536 kb/s systems may also be accommodated by the module. The ability to rearrange multiplexes is achieved by manual interconnection techniques.

In addition to providing for the rearrangement of transmission multiplexes on the switchblock inlets, the digital distribution frame DDF performs the following functions:

1. Direct interconnection (or "patching through") of transmission multiplexes not terminating on the switch;
2. Interconnection of VF Sender/Receiver units to transmission lines;
3. Interconnection of MF sender/receiver units and switch;
4. Connection of certain switch output to Channel 16 Multiplex Receivers and connection of Channel 16 Multiplex Senders to certain switch inputs;
5. Simplex connection of service tones and recorded announcements to switch inputs;
6. Duplex connections between switch and such auxiliaries as echo suppressors and transmission systems;
7. Duplex connections between echo suppressors and transmission systems and
8. Application of test multiplexes to switch for switch and transmission testing.
9. Connection of those transmission multiplexes which contain national network synchronisation data to the Exchange Timing Unit and thence, again via DDF, to the switchblock. The digital distribution frame DDF connects incoming and outgoing p.c.m. multiplex highways to the switch block SB of the digital switching subsystem. The switch block SB consists of three modules shown in FIG. 1 as a digital line termination module DLT, a time switch TS and a space switch module SS.

Figure 2:
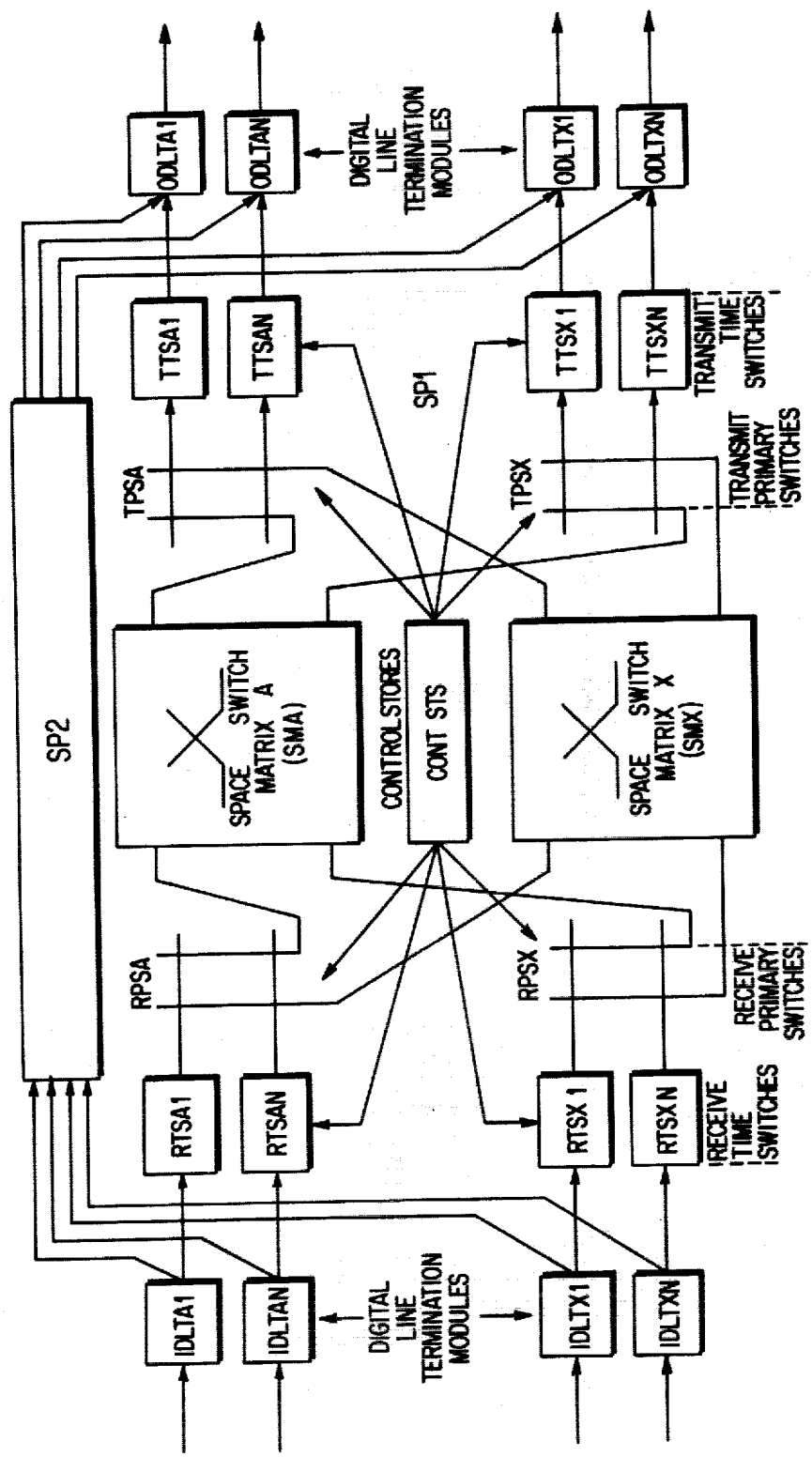
FIG. 2 shows a block diagram of the space switching network of FIG. 1.

FIG. 2 shows the constitution of a typical switch block SB in more detail. Two planes of T-(s)-S-(s)-T switching SP1 and SP2 are employed in the switch block SB, however, only one such plane SP1 is shown in detail FIG. 2. The second plane SP2 is arranged to include identical modules to those shown in SP1 of FIG. 2. Each plane comprises a number of receive time switches RTSA1 to RTSXN, a space switching network array involving an (s)-S-(s) configuration together with a number of transmit time switches TTSA1 to TTSXN. The (s) sections are provided by the receive primary switches RPSA–RPSX and the transmit primary switches TPSA to TPSX. The central S section if formed by matrices SMA and SMX.

DIGITAL LINE TERMINATION (DLT) MODULE

Each PCM system terminated on the exchange is provided with a digital line termination module (DLT) which performs the following functions:

1. conversion between the HDB3 line signal and binary code;
2. frame alignment between the local and remote clocks (alignment-induced information loss is arranged to occur in intergral frame units)
3. provision of line-alarm indicators;
4. insertion of the synchronisation pattern;
5. provision of facilities for path check access;
6. parity generation and checking on received and transmittted speech codes respectively;
7. distribution of one receive multiplex to two receive time switches, located in different security planes of the switch;
8. selection on a per channel basis based-on parity bit of which of two transmit time switches outputs, located in different security planes of the switch is transmitted to line and 9. comparison of data samples from two planes 10. allows extension of one plane of the switch while the other is carrying traffic (this facility is performed by the provision of a common controlled lock on the transmit sample selector at the output of the converging security planes).

Each digital line termination unit DLT provides a number of basic line termination activities segregated into four circuit elements in a RECEIVE SECTION and two circuit elements in a TRANSMIT SECTION. These activities will be considered briefly below relative to the referenced blocks of FIG. 13.

CLOCK RECOVER AND LINE CODE CONVERTER

This circuit provides a clock recovery and line code conversion function. The recovered clock RECL provides a clock drive for the rest of the receive section whereas the line code conversion changes the HDB3 line signal on leads LI from the digital distribution frame DDF (FIG. 1) to pure binary code. The line code decoder also includes a line fail alarm (signal LF) generator.

SYNCH. SEARCH AND RECOVERY CIRCUIT

This circuit provides for synch. searching and recovery after the loss of a single frame synchronisation pattern is detected (signal ERR) or when a total loss of frame synchronisation is detected (signal LS). The synch. search and recovery circuit is also used to detect an alarm from the remote terminal (signal AFR).

REMOTE FAIL DETECTOR

This circuit is used to detect a remote digital section failure which is the detection of no information being received (i.e. a good line signal carrying a frame synchronisation pattern but no information in any time slot). The alarm signal produced by the circuit is ORed with signal AFR to produce the remote alarm signal RA.

FRAME ALIGNER

This circuit provides frame alignment between the local and remote clocks and alignment induced information loss is arranged to occur in integral frame units.

ALARM INJECTOR

This circuit is used to insert remote alarm signals into outgoing time slots when instructed by the common control over lead ATRPU or from the ALARM EQUIPMENT over lead ATRE.

TRANSMIT LINE ENCODING EQUIPMENT

This circuit is used to encode the binary samples passed from the transmit time which stores into the HDB3 line transmission code for application to leads LO to the digital distribution frame (DDF FIG. 1).

In addition to the basic line termination activities the DLT plays an important role in the switch assembly mechanism.

Following frame alignment, the DLT inserts parity on the received speech samples using a parity bit generator PARITY INJECTOR before feeding the inputs to the duplicated switch planes shown as RTSP1 and RTSP2 in FIG. 13. The transmit part of the DLT function refers to the outgoing parity state at PARITY CHECKER 1 and PARITY CHECKER 2 to decide which security plane (shown as TTSP1 or TTSP2 in FIG. 13) of the switch should provide an output through the PLANE SELECTOR to the transmit line LO via the TRANSMIT LINE ENCODING EQUIPMENT.

The security plane selection is performed in a channel conscious manner for each 32-channel transmit multiplex. Where the choice is to be made on a per-multiplex basis, the broadcasting of a fault from the receive side of the trunking could rapidly affect many or all the transmit selectors, putting one complete transmit plane out of service. There would then be a significant probability of an unacceptable fault incidence in the remaining plane.

The selector on a transmit 32-channel multiplex will only adopt a continuous preference under the control of the security plane changeover signal SPCO for one plane if the error rate monitor indicates a regular fault incidence on a significant proportion of channels from the other plane. This fault threshold will be presettable to a level which will be determined by experience of prototype equipments.

Locking of the selector to one plane can also be used as an aid to maintenance and extension operations.

Also included in the Digital Line Termination Function is data comparison of the samples emerging from the output paths from the two security planes TTSP1 and TTSP2 using the COMPARATOR. This detects the convergence of two different (but parity-correct) paths on one outlet channel.

The various alarm conditions generated in the DLT and detected by the parity check circuits PCP1 and PCP2 and the COMPARATOR are passed to the ALARM ENCODER. This encoder produces encoded alarm signals on leads EAS and these signals may be priority encoded according to the significance of the fault to the performance of the switchblock. The signals EAS equate to those shown as LF, E, SL&R in FIG. 1.

Time Switching Module (TS)

The time switching module TS is shown in FIG. 1 as being fed from a data point of view on one side by the digital line termination modules DLT and on the other side by the space switching module SS. The actual sub-secitons used to form the time switching module TS comprise the receive time switches (RTSA1-RTSXN in FIG. 2), the transmit time switches (TTSA1-TTSX in FIG. 2) and the control stores (CONT STS). The control store arrangement CONT STS is also used to provide the addressing information for the space switch columns allowing the passage of a demultiplexed channel across the switching network into a selected location in a transmit time switch store. The transmit time switch location is selected under the control of information held in the control store arrangement also.

The control store arrangement comprises one control store for each receive time switch. Each control store is formed of 512 locations each location being of 21 bits. Each location is allocated to a cross-office slot and stores a receive time switch address and a transmit time switch address together with a cell status code.

Figure 3:
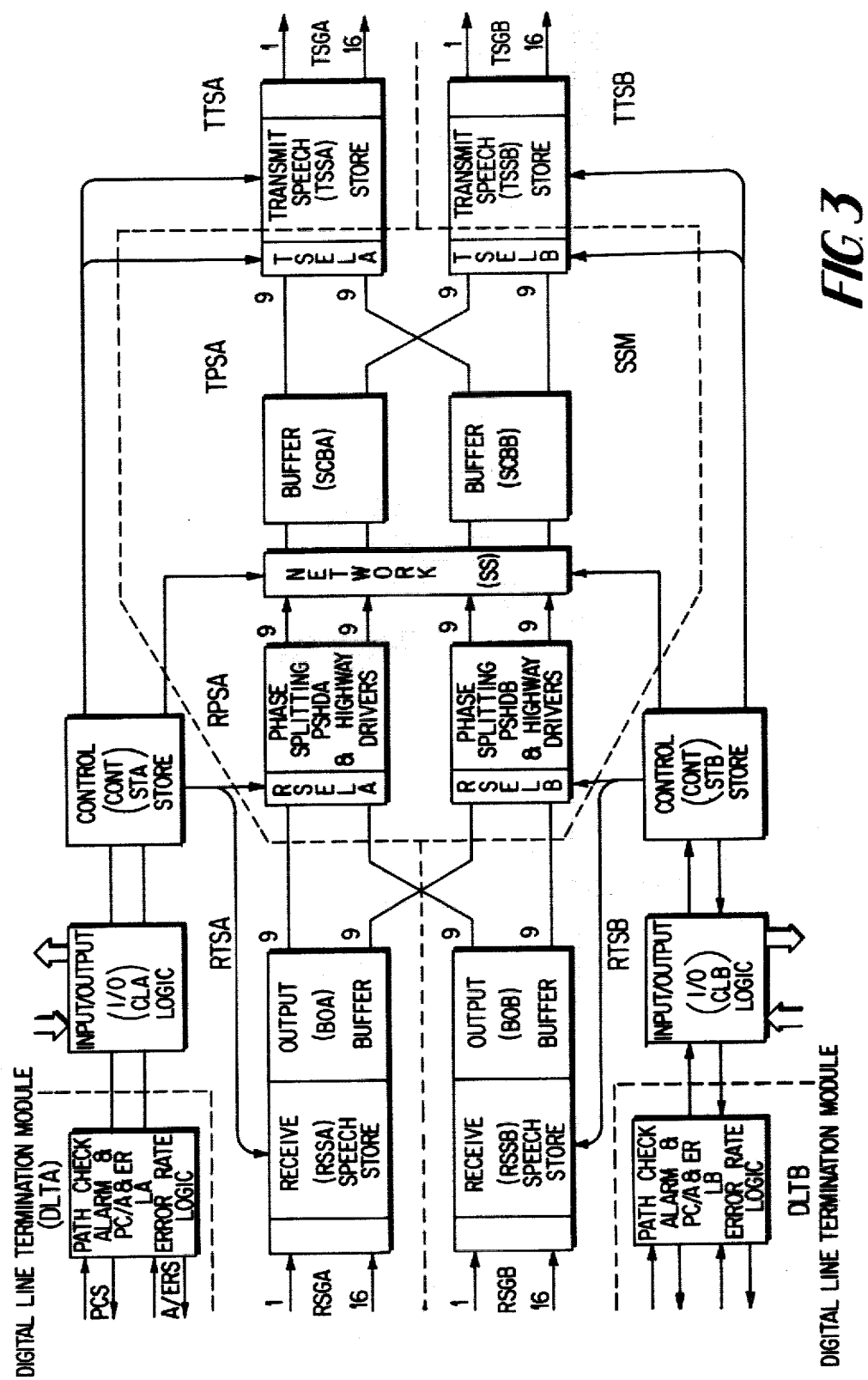
FIG. 3 shows a block diagram of the time switching arrangement of FIG. 1.

The time switching module is shown in FIG. 3 and comprises several sub-modules. Some of the equipment shown in FIG. 3 are functionally part of the digital line termination modules DLTA and DLTB and the space switching module SSM. The digital line termination module function shown in FIG. 3 is defined as a "pathcheck, DLT alarm and error rate logic" arrangement PC/A&ERLA for example which handles path check access signals PCM and DLT alarm and error rate signals A/ERS to and from the corresponding digital line termination module (such as DLTA).

Each receive time switch such as RTSA comprises a serial-to-parallel conversion logic and a receive speech store RSSA having 512 locations of 9 bits per location and serving the receive paths of a group of up to 16 balanced aligned thirty two channel p.c.m. systems emanating from the corresponding digital line termination module overleads RSGA1 to 16. The information is written a channel at a time as it occurs into the receive speech store and it is extracted in parallel form (i.e. eight bits plus parity) under the control of the receive time switch control store CONT STA. Each receive speech store (such as RSSA) includes an output buffer BOA which provides duplicated outputs to the 2×2 space switching stage RPSA which operates on its input at twice the receive system p.c.m. bit rates.

The space switching module SSM is arranged to include phase splitting and highway drivers such as FSHDA which drive the exchange highways and have input selectors RSELA controlled by the control store CONT STA. The exchange highways are 9 bit parallel paths operating at the same rate as the receive system p.c.m. bit rate. After space switching in the network SS speed conversion buffering occurs in the buffers such as SCBA before application to the transmit speech stores such as TSSA.

Each transmit speech store (such as TSSA) comprises a 512 location store having 9 bits for each location and includes an input selector TSELA, forming the 2×2 space switch TPSA.

The input selector TSELA and the "write" store addressing are controlled by address information from the corresponding control store (such as CONT STA).

Each control store (CONT STA) as previously mentioned has one location for each cross-office slot-on an exchange highway and the information to select the receive speech store to the transmit speech store for each cross-office slot is programmed into the control store when a connection is set up by way of the input-/output logic such as I/O CLA. The cross-office slot address information is computed in the central control units of the hardware control module of CH FIG. 1.

WAVEFORM GENERATOR (WG FIG. 1)

The Waveform Generator receives secured clock waveforms from an external exchange timing unit (not shown) over lead TU. The waveform generator originates a local frame reference timing in a secure manner and distributes clock and frame signals CFDLT, CFCH, CFTS and CFSS to regenerators located in the various modules of the switching equipment.

These regenerators provide local sources of frame signals and various frequencies of synchronous, secured clock, within their respective modules.

ERROR RATE MONITOR (ERM)

The error rate monitor is responsible for (i) calculating the error rate on each receive P.C.M. highway and (ii) checking the persistance of this rate before raising any alarm. An error is defined as the loss of an expected frame synchronisation pattern. However, three consecutive errors are regarded as total loss of synchronisation and no further error monitoring is implemented until satisfactory synchronisation is re-established. For simplicity the alarms associated with the digital line termination modules and the error rate monitor share a common I/O interface as shown in FIG. 3.

The method of calculating error rates uses the fixed seven (bits 2-8 inclusive) bit frame alignment signal in TS$\phi$. Bit 1 of TS$\phi$ is not part of the frame alignment as it is reserved for international supervisory facilities. The error rate monitor detects the loss of an integral pattern in "n" repetitions.

Being a "rate monitor" a number of timing functions are implied. The module includes a single set of timers and associated control logic supplied on the basis of one per 16 line system terminations rather than on a one to one allocation.

Errors are detected by the frame synchronisation circuits contained within the Digital Line Termination module. The DLT module produces the following alarms associated with the incoming line:

1. LINE FAIL (LF): Loss of all incoming LINE signals.
2. ERROR (E): Loss of single frame synchronisation.
3. SYNCH. LOSS (SL): Total loss of frame synchronisation.
4. REMOTE (R): Combination of alarm from remote terminal and Remote Digital Section Fail (RDSF) which is the detection of no information being received, i.e. a good line signal carrying a frame synchronisation pattern but no information in any time slot.

The error alarms pass to the error rate monitor ERM over leads, LF, E, SL and R where error rates are measured. Error rate alarms along with Line Fail, Synchronisation Loss and Remote alarms are passed to the alarm monitor unit. A persistence check will be made on these conditions before the alarms are raised.

Alarm reports are reduced by combining alarm messages if and when necessary. Two, or three, DLT's are serviced by a single 24 bit word. A 5 bit address to identify the particular DLT followed by a 7 or 3 bit alarm code. A typical 3 bit alarm code is shown below as follows:

Alarm: 3 bit
Error Rate 1 in $10^5$: 001
Error Rate 1 in $10^4$: 010
Error Rate 1 in $10^3$: 011
Remote Alarm: 100
Sync. Loss: 101
Line Fail: 111

An alarm report is only made when an alarm condition changes. Thus, normally, one message is input for an alarm being raised and another for the alarm condition being removed. The actual error rate monitor is shown in FIG. 4 and it includes a working store WS and associated control logic CL. A minimum of 24 bits per DLT would be needed. The structure of the store if such that each error rate (i.e. 1 in $10^5$, 1 in $10^4$ and 1 in $10^3$) has 8 bits of storage. These eight bits are divided such that one bit is an indicator, six bits from a counter and the last bit is a memory or overflow bit.

When an "error" is detected, three indicator bits are set in the store associated with the particular DLT reporting the error. Each indicator is reset at regular intervals—0.2s, 1.4s and 12.5s. On the arrival of the reset pulse a counter is incremented if the corresponding indicator was set. There is a separate counter for each indicator. If, on the other hand, the indicator was not set during the time interval between reset pulses the counter is reset. When the contents of a counter reaches a prescribed level (50, 36 or 16) the appropriate alarm is raised.

HARDWARE CONTROL (CH FIG. 1)

The hardward control performs the following switching network path process functions under instruction from the Digital switching system handler software process:

Path search
Path set up (simplex/duplex as required)
Path reserve
Path clear
Path trace
Path check
Routining of the switch
Maintain integrity of the two switch planes A Broad outline of the component parts of the hardware control is shown in FIG. 5 it provides an interface between the digital switching system handler process (i.e. the processor system bus PB) and the time switch stores TS I01 to TS ION. The control hardware essentially comprises replicated central control units, (CCU1-3) control and data interfaces (MDU1-N) to the switch block and input/output interfaces (IOB1-2) to the processing system. All the switch actions such as path search, trace, clear, reserve, etc. are handled by the CCUs in parallel and in complete synchronism. For security reasons, the CCUs are triplicated so that single faults can be detected. The CCUs will control the security planes of the switch.

Each switch control store has two interfaces to the central control units, i.e. status interface such as SI1 and control interface such as CI1. The status SI1 is simplex and serial and is used to carry the busy/free states of each time slot to the CCUs. The control interface CI1 is duplex and allows interrogation or updating of the control stores and debris collection.

The busy/free states of each switch in both security planes are transmitted synchronously and continuously to each CCU. Each CCU has therefore direct access to the busy/free states of any part of the switch and can thus determine free paths through the switch.

Data from each CCU is subjected to majority decision using the majority decision units MDU1 to MDUN before being sent synchronously to any connection control stores. Output data from a time switch is sent to all three CCUs.

Majority decision is also applied on messages from a CCU to the I/O input/output buffers IOB1 and 2 which compares the messages from each CCU, reconciles any clashes and places a single message into an input queue in one of the direct input/output interfaces IOI1-2. The input queue is subsequently emptied by the DDS handler process using DIO (FIG. 1). The Input-Output buffers IOB1-2 also manage an output queue in the input/output interfaces IOI/1-2 which is filled by DIO and emptied synchronously to the three CCUs in parallel.

For security the processing system has two input/output interfaces IOI1-2 to any device. The choice of interface used at any specific time is controlled by the processor operating system and this is unknown to the DSS handler. In order that both the I/O buffers are accessible to the DSS handler at any time, a cross-connection between the buffer and the input/output interfaces is provided.

The Central Control Unit

FIG. 6 shows a schematic of a CCU. Tasks arrive at the CCU from the output buffer of the input/output interfaces and are stored in output registers OR which are controlled by the input/output control I/OC. The command register CR contains indicators which are set by the DSS handler process to control the functions of the CCU (e.g. Out of Service, Reset, Stop Input, Stop Output, etc.). Similarly there are input registers IR under input/output I/OC message transfers to the DSS handler process. There is also a status register SR which indicates the current state of the CCU and is used primarily to indicate faults within the CCU, and its busy/-free status.

The status wires B/FSP1 and B/FSP2 from the time switch controllers are terminated on data selectors SI1 and SI2 to enable selection of these for path search purposes.

The state of the 2×2 switch and the busy/free nature of the time switches is described by a three bit code for each cross office slot. These bits are interpretted at the CCU as indicating which time switch of the pair is using which plane of the central space switch in each slot.

The switch status interface, therefore, consists of three balanced 2 Mb/s highways from each time switch pair to each CCU, and a complete 512 slots worth of information would take two frames to signal to the CCU. Two comparison logic units CLP1 and CLP2 are provided to allow the two planes to be search independently. However, the function control logic FCU will under normal conditions select those paths which are identical in the two planes.

Data multiplexors DIIF and demultiplexors DOIF are used on the control interfaces to effect communication to selected time switch controllers.

Full use is made of the fact that the central control units (CCU) and the Time Switch Controllers have a common clock source. This obviates the need for a timing waveform to be transferred from the CCU to the time switch and vice versa. In order to reduce the wiring between the CCU and the time switches further, a message data format is used which indicates within the data fields that it is a valid message. Data-out (DO) and data-in (DI) messages are made to share the same balanced signal lead pair, making use of the PARTY LINE facility offered by integrated circuit packages used both as receivers and drivers.

A 2 Mb/s serial highway provides 256 data slots in each frame period which is divided into four 64 bit periods, the first two for data-out messages and the second two for data-in messages.

Since in a general call set-up or clear-down procedure, two time switch controllers are involved the CCU's are organised to send-to and receive-from two controllers in one frame period. A controller which is sent-to during the first half of the DO period will always reply during the first half of the DI period (but several frames later). Similarly a controller sent-to during the second half of the DO period will always reply during the second half of the DI period. In this way the interface controller is able to apply the time switching addresses to the input port selectors at the times when messages are expected.

A block diagram of the combined input/output interface is shown in FIG. 7.

Time switch control port selector (TSCPS FIG. 7)

This selector terminates up to thirty-two 2 Mb/s bi-directional highways DO/IL1–96. Input multiplexers I/PMUX and output demultiplexers O/PDEM are controlled from the controller I/OC which applies addresses at the DO and DI frame times. The actual control port selector which serves the T/S controller involved in a transfer is enabled by the I/O controller and it adopts DO or DI mode by reference to the periodic send/receive signal S/R which also comes from the I/O controller.

Data-out registers (CDOR)

The parallel-in/serial-out data registers CDOR1 and CDOR2 are provided which are loaded by "load register 1" (LDO1) and "load register 2" (LDO2) commands from the CCU controller "send register 1" (SR1) and "send register 2" (SR1) commands are applied by the I/O controller at the correct frame times if an output sequence is in progress.

Data-in registers (CDIR)

Two serial-in/parallel-out data registers CDIR1 and CDIR2 are provided. Their outputs are selected under command of the I/O controller and presented as parallel words to the CCU over leads CDI. The control port selector TSCPS from which the DI registers must accept data is selected by the two most significant bits (2MSB) of the port address CPA from the I/O controller. Logic is located in this equipment for detecting when a message has been received in the DI registers and this is signalled to the I/O controller by way of signals MR1 and MR2.

DI/DO Controller (IOC)

This equipment includes registers AR1 and AR2 which are loaded with the addresses of the time switch control ports to which data is to be sent. They are loaded by "Load address 1" (LAR1) and "Load address 2" (LAR2) commands at the same time as data is loaded into the CDO registers. The two time switch addresses are selected at the correct frame time and applied to the port selector TSCPS along with a decoded enable signal EN. When DO messages have been sent to the time switch controllers, the I/O controller retains their addresses and applies them to the input (I/P) port selectors until the replying DI messages have been received. When the CDI register logic CD IR detects an input message it informs the I/O controller over MR1 or MR2 which then checks on how many messages were outputted in the last output sequence. If only one message had been (as might be the case when a path trace is being carried out) then the I/O controller immediately selects the CDI register containing the message and generates an "input message ready" signal (I/PMR). If two messages have been sent (as in a normal call set-up procedure) then the I/O controller waits until a further input message arrives before generating signal I/PMR. The CCU will then ask for CDI REG 1 and CDI REG 2 data and the I/O mechanism is ready for another I/O sequence.

A general reset "clear all registers" (CLAR) can be applied to the I/O controller, for example, when the replies to output messages have been timed-out because of a faulty T/S controller.

Call set-up data concerning an 'own time switch' call is sent in exactly the same way as the more general case. The addresses in address register 1 (AR1) and address register 2 (AR2) will be identical and the DO/DI frame structure is maintained. Because two sets of control stores are associated with one time switch control interface a bit is contained in DO messages specifying the control stores to be updated. Similarly, DI messages contain a bit to specify the originating control store.

Majority Decision Unit (MDU1 to MDUN FIG. 5)

The majority decision unit is interposed between each time switch and the central control units. Majority decision is applied on all request for interrogation, updates etc. so that faulty request are eliminated. As a result of majority decision a single message will be sent to the time switch.

A message from the time switch on the control interface is buffered by the majority decision unit and sent synchronously to all three CCU's.

A block diagram of the major functions of a majority decision unit is shown in FIG. 8. In this diagram reference is made to two clock signals 4MCL and 2MCL and these are respectively 4 Mb/s and 2 Mb/s rates.

Two data-out registers MDOR1 and MDOR2 are provided to cater for the case when an "own time switch" call requires the interface to accept two messages successive DO frame periods. The term 'own time switch' refers here not only to calls within a single time switch, but also to calls from one time switch to the time switch which shares its control interface.

The output messages from the three CCU's are subjected to a comparison in comparators C1, C2 and C3 in the comparator storage equipment CS and these comparators indicate if a discrepancy is detected at any stage during an output message. If the message passed by one CCU is corrupted then two of the comparators will register a discrepancy and it can be deduced which CCU was in error. This is signalled back to all the CCU's during the input reply to that output transfer using the fault report signals FRM1 and FRM2. If the data from two of the CCU's is corrupted then all three comparators will register a discrepancy and the message will be ignored. An input message could still be generated indicating that the output was corrupted by more than one CCU. No matter what degree of corruption of data takes place, the '2-out-of-3' majority decision logic MD2/3 will always obtain an output on a bit by bit basis and it is this output which is shifted into MDO REGISTER 1 and MDO REGISTER 2. Register 1 is filled during the first DO period and Register 2 during the second period. When messages have been received (or a message has been received in the case of a non-own time switch call set-up) the output from one of the DO registers is selected and the time switch control store which is addressed will write the data into its store.

Then the other DO register will be selected (if both registers contain messages) and the data will be written into a control store. Eventually the control store (s) will reply and input messages will be loaded into the MDI registers for transmission to the CCU's at the frame period defined by the DI/DO frame structure.

CONTROL SOFTWARE (CS FIG. 1)

The control software includes five processes detailed below. They may best be considered as functional divisions although in practice some of them may be amalgamated into a single process.

1. The Switch Handling Process

This process accepts requests from various software processes for "set-up", "cleardown", "trace" or "reserve paths". It formulates the messages for output to the processor I/O medium to control the digital switch module DSS, accepts the responses from that module and, after analysis, returns a response to the requesting software process.

2. Debris Collection and Routining

This process carries out the functions which are necessary to ensure continued satisfactory operation of the digital switch module. The functions are performed on a cyclic basis with the objective of processing the entire switch once in 12 hours.

They include:

1. Checking the switch for part paths and double connections.
2. Test connections over all links.
3. Persistence checks connections, and confirms the correctness of persistent connections against call records.

3. Diagnostic Process

This process is responsible for diagnosing the location of a fault down to replaceable module level, once a faulty security area has been identified. It receives requests to diagnose a security area and returns responses which either identify the unit to be replaced or indicate that the area is functioning correctly.

4. Fault Interpretation Process

This process receives fault messages from the Switch Handling Process and fault messages from the switch hardware. It keeps a store of "leaky-bucket" fault counts, one for each security area. When a count overflows, the security area is marked as faulty in the status tables and a message is sent to the diagnostic process for analysis.

5. Database Update Process

This process handles requests which alter the switch configuration and database. Types of requests include:

A. Add a new unit
B. Remove a unit
C. Return a unit to service
D. Remove a unit from service
E. Update an entry in the NTN to route and circuit translation table
F. Read status table entry
G. Read translation table entry
H. Read fault count.

Of the above processes the only process which requires to be further defined for a full understanding of the embodiment of the invention is the switch handling process.

When a timing message is received, the process examines the hardware input queue of the switch and handles any responses waiting in the queue. It then examines its queue of waiting requests and processes as many of these requests as it can, ensuring that the output queue of the switch does not overflow. When the output queue is full or when the request queue is empty, the process handles other tasks, such as responses from the "Store Allocator", which do not require hardware actions. By using timing messages to ensure that the process runs at regular intervals, it is possible to prevent undue delays to individual requests even at low traffic rates when the handler process may have little work to do.

Task Format

The Switch Handling Process maintains a common interface to all subsystems and requesting processes, although all request types may not be available to all subsystems. The task type held within the request will define the action to be performed by the switch hardware and this will normally be written to the hardware command register unchanged. Certain requests will require multiple hardware actions to be co-ordinated by the switch handler.

Request Validation

Each request is validated before being processed. A table is held that identifies the valid request types for each requesting process and the destination of the response.

After validation, the switch status map is examined to determine whether the switch hardware is available through both planes of the switch. The command word provided in the task type is then modified to indicate whether both planes are to be used.

Recording of Request in Progress

Each new request is allocated an 11-word data slot from the free chain of slots. All the words in the request are stored in the data slot along with a link word, which identifies the chain to which the request belongs and the place within that chain, and a timer word which is used to identify when a response to the request is overdue.

Types of Chain

The data area for recording request in progress consists of four chains of slots.

(a) Free Chain
(b) Chain of requests waiting for normal transfers
(c) Chain of requests waiting for path check
(d) Chain of requests waiting for backing store access.

Chains (a) and (b) are singly-linked since slots are always added at their ends and removed from their heads. Normal operations are performed by the switch hardware in the same order in which they are requested therefore chain (b) can operate in this first-in-first-out mode. Chains (c) and (d) are doubly-linked because the operations for which the requests within these chains are waiting may take a variable length of time. Thus, although requests are always added to these chains at the tail, they may be removed from anywhere in the chain.

Timeout Mechanism

Each request is associated with an integer value when it is accepted. This value is obtained from a timer word which is incremented each time a timing task is received. A request will be considered to have timed out when a response to it has not been received and the difference between the current timerword and the value stored in its data slot reaches a specified limit.

In order to discover timed out requests, chains (c) and (d) must be searched over 10 ms and each task examined individually for the timeout condition.

The Central Control Units CCU Operation

The basic requirement of the CCU FIG. 6 is for a block for sequential logic to control the data selectors and demultiplexers which provide the fan-out to the switch control hardware. The control of these requirements is provided by the functional control unit FCU (FIG. 6). Flow charts shown in FIGS. 9 to 12 indicate interaction between CCU and the time switch controllers.

Actual CCU programs comprise basically of instructions which transfer information between registers, monitor flags and control the program counter.

The hardware implementation of this programmable logic may be either a general purpose microprocessor or a specialised counter addressed read-only memory, designed to fulfil the required control sequence.

The switch control process functions of SEARCH, SET-UP, CLEARDOWN, CHECK and TRACE are executed on a one-at-a-time basis and are shown in the flow charts of FIGS. 9 to 12.

It is assumed that those skilled in the art are capable of converting the flow diagram information into either version of function control unit referred to above. The flow charts it is believed can readily be converted into micro-processor programs or combinational logic operation diagrams without resorting to inventive activities.

Each time the digital switching system handler process has a message for the digital switching system hardware it interrogates the central control unit's status register in the control hardware CH of FIG. 1. This operation equates to testing to see if the output queue of the digital switching subsystem is full and is indicated at Step S1 in FIG. 9. The performance of step S2 concludes the operation of the handler process (DSSHP). When the control hardware is ready to perform another command it commences a CCU operation (CCUOP) by unloading the next message in the output queue and decoding (Step SC1) the command word of that message. The message includes the identity of the digital switch terminations to be involved in a connection together with the command word which defines the type of connection required. Typically the command word comprises a linearly coded field having one bit for each of the following functions (i) path search, (ii) path check (iii) path trace (iv) path cleardown and (v) routining. Certain combinations of these functions are possible and the decoding of the command code causes entry into path search (A) path trace (B) or path cleardown (C) sequencies. Typically "path search and path check" command cause entry into the path search sequence whereas "path trace" and "path trace and cleardown" commands cause entry into the path trace sequence whereas a "cleardown" command causes entry into the path cleardown sequence. The termination (or call) identity information comprises (i) for the calling or subscriber the superhighway identity SHX and the superhighway channel identity CHX and (ii) for the called or Y subscriber the superhighway identity SHX and the superhighway channel identity CHX.

Path search (A)

FIGS. 10a and 10b show the operation performed for a path search algorithm and these figures should be placed with FIG. 10a directly above FIG. 10b as shown in FIG. 9.

The operations performed in a "path search" involve the transferring of the call identities to the central control units (Step SA1), the searching for and registration of a free cross-office slot (XOS) in the time switch stores of a pair (Steps SA2 to SA5), the formation of the partner cross-office slots Y for a duplex call (Step SA6), the setting up of the time switch stores with the call data (Step SA7 to SA10), the checking of that operation (Step SA11) and the reporting to the processor system of the completion of the path search algorithm (Step SA12) assuming "path check" is not also required. If "path check" is required and decision is made at step SA13 with reference to the command field. Steps SA15, SA16 and SA17 cause the path check operations to be performed and conveniently the operations involved may be of the type defined in Complete Specification Serial No. 1,450,457.

Throughout the flow diagram of "the path search" algorithm (FIGS. 10a and 10b) certain fault condition sequences are provided. Of these sequences, steps SA18 and SA19 are used when a free cross-office slot can not be found and the status information written into the status word of an input message reflects this fact. Similarly steps SA20 and SA21 are used when a path search fault is detected when the data sent out to the time switch control stores does not agree with that returned by those control stores (Step SA11). Whereas steps SA22 to SA24 are followed when a "path check" operation fails.

Path Trace (B)

FIGS. 11a and 11b show the operations performed for a "path trace" algorithm and these figures should be placed with FIG. 11a above FIG. 11b as shown in FIG. 9.

The operations performed in a "path trace" involve the conditioning (Step SB1) of the input and output data selectors of the time switch control store identified by the SHX field of the output message sent to the DSS requesting the path trace operation. The channel number CHX of the path to be traced is then sent (Step SB2) to the time switch control store selected in step SB1. When the time switch control store records which includes the channel number CHX, are found the entire record from each plane is read into the CCU complex and tested (Steps SB3, SB4 and SB5). If the CHX channel number is not found (i.e. SB3 gives a no response) Steps SB6 and SB7 are performed clearing the "path trace" instruction from the time switch control store and indicating "time-out" to the CCU complex.

The data comparison operations performed in step SB5 are CHXR=CHX; XOSRP1=XOSRP2; SHXRP1=SHXRP2 (where CHXR, XOSR and SHXR are the received fields from the contents of the time switches of the two planes and CHX is the field received from the DDS handler process).

The tests performed in step SB5 result in entry into one of four sequences dependant upon the results of the tests applied. Assuming that no fault condition is detected (i.e. all data tested is valid) the sequence causes the second time switch record of the duplex path to be searched for (Steps SB7, SB8, SB9 and SB10). Again upon coincidence the data from the found time switch and space switch cross point records (TS & SSXP step SB11) is read into the CCU complex and tested (Step SB12). The data validated in step SB12 is similar to that compared in step SB5 and at the same time step SB13 causes the time slot XOSR (i.e. that received for the time switch) to be tested against XOSS (i.e. that sent to the time switch). If both step SB12 and SB13 equate steps SB14, to SB17 are performed causing the I/P queue for the control hardware to be loaded with the data relevant to the path traced. Before entering a new sequence the original command is tested (in step SB17) to see if "path trace and cleardown" was called for.

Throughout the sequence various points exist where fault conditions can be detected causing the status word of the input message formed in the control hardware input queue to be set up in accordance with the fault condition found. For example step SB18 and SB19 cause a faulty plane to be defined and inhibited whereas steps SB20 and SB21 cause a path trace operation to be suspended when both paths in the two planes are found to be faulty. Similarly part paths in both (Step SB22) or either (Step SB23) planes cause the entry into steps SB24 to 26 clear down the path trace sequence and to indicate a "data incompatible" condition.

Cleardown (C)

FIGS. 12a and 12b show the operations performed for a path cleardown algorithm and these figures should be placed with FIG. 12a directly above FIG. 12b as shown in FIG. 9.

The operations performed in a "path cleardown" involve the addressing of the time switch control store data selectors with SHX (Step SC1), the reading into the CCU of the cross-office slot data of the call path to be cleared and the checking of the time switch records (Step SC2, SC3, SC4 and SC5).

Assuming that the data read from the time switch control store entries agree the partner cross-office slot (i.e. that dictated by CHY) is searched for in the other time switch used on the call and the records compared (Steps SC8, SC9, SC10 SC11, SC12 and SC5). An internal administration flag (1st Pass) is used to allow the dual usage of Step SCS.

When both sets of entries have been checked steps SC7, SC13, and SC15 are performed to check that the pair of cross-office slots found have been used on the same call by checking that the cross-office slots values are separated by 256.

When the above operations have been completed correctly the CCU's will know that the time switch control store records found do relate to the call path to be cleared down and steps SC16, SC17, SC18 and SC19 cause the entry in the first pair of time switch control stores (referred TS(A)) to be zeroed. Steps SC18 and SC19 indicate the checking operation performed on the data sent back from the TS(A) pair after the over-writing operation has been performed. Steps SC20, SC21, SC22, and SC23 cause the entry in the second pair of time-switch control stores (referred TS(B)) to be zeroed. Steps SC22 an SC23 again indicate the checking of the "data-back" whereas step SC24 checks that the records have been zeroed.

The performance of step SC24 complete the actual operations of the cleardown algorithm as far as the time switch control stores are concerned and steps SC25, SC26, and SC27 cause the digital switching subsystem process handler input message to be formed in the input queue of the control hardware.

As with other algorithms various sequences are shown in FIGS. 12a and 12b which deal with the communicating of differing fault conditions as they occur or are detected.

What we claim is:

1. A digital switching arrangement for use in a processor controlled telecommunications switching exchange, the arrangement comprising:
    an exchange control processor,
    a digital switching network arranged to provide connection paths between any channel on any of a number of incoming time division multiplexed exchange highways and any channel on any of a number of outgoing time division multiplexed exchange highways,
    a switching network connection control equipment arranged to control the operation of the digital switching network in the setting-up and clearing-down of connections, and
    a control arrangement;
    said control arrangement including:
    a plurality of output buffer registers forming an output queue into which output messages are written in time-of-arrival order by the exchange control processor, each output message including information indicative of the identities of the incoming and outgoing exchange highways and channels involved in a switching network path,
    a plurality of input buffer registers forming a time-of-arrival ordered input queue from which input messages are read by the exchange control processor, each input message including information indicative of connection handling operations, and
    a plurality of central control units, each connected to receive information from the output buffer registers and to pass information to the input buffer registers and to intercommunicate with the switching network path connection control equipment, each central control unit being arranged to concurrently process an output message by performing a stored sequence of operations in accordance with the processing operation required to control the switching network path connection control equipment so as to process the required network operation, and at the end of the processing operation to generate in the input queue an input message indicative of the actions performed in the handling of each output message.

2. A digital switching arrangement according to claim 1, wherein each central control unit includes input buffer registers, a plurality of majority decision means being interposed between the central control units and the switching network connection control equipment for comparing information generated by the central control units and for preventing minority information from being passed to the switching network connection central control equipment.

3. A digital switching arrangement according to claim 1, wherein each central control unit comprises a micro-processor having program storage for storing the sequence of operations relative to path search, path trace and path cleardown operations.

4. A digital switching arrangement according to claim 1, wherein the digital switching network includes a time switching network section comprising a plurality of receive stores and a plurality of transmit stores arranged in pairs, each receive store of a pair serving a plurality of incoming exchange highways, and each transmit store of a pair serving a corresponding equal plurality of outgoing exchange highways, each receive store being served by a receive highway, each transmit store being served by a transmit highway, each having a plurality of cross-office slots, and said digital switching network further comprising a space switching array providing selective connection paths between any one of the receive highways and any one of the transmit highways, and wherein the path connection control equipment comprises a plurality of control stores, one for each pair of receive and transmit stores, and having one location for each cross-office slot on a receive exchange highway into which is written information indicative of the receive store and transmit store connections required for the corresponding cross-office slot.

5. A digital switching arrangement according to claim 4, wherein, a pair of identical digital switching networks are provided, and each pair of incoming and outgoing exchange highways is provided with line termination equipment having appearances on both networks and arranged to co-operate with both digital switching networks concurrently.

6. A digital switching arrangement according to claim 5, wherein an error rate monitor is provided, and each line termination equipment includes means for detecting and indicating error conditions, and the error rate monitor includes means for calculating the error rate on an incoming exchange highway.

7. A digital switching arrangement according to claim 6, wherein the error rate monitor includes means for checking the persistence of the error rate prior to producing an alarm indication.

* * * * *